Nov. 20, 1962   H. H. WRIGHT   3,064,410
APPARATUS FOR SEPARATING WELL FLUID
Filed March 25, 1960   2 Sheets-Sheet 1

INVENTOR.
Harold H. Wright
BY
C. M. McKnight
ATTORNEY

Nov. 20, 1962  H. H. WRIGHT  3,064,410
APPARATUS FOR SEPARATING WELL FLUID
Filed March 25, 1960  2 Sheets-Sheet 2

INVENTOR.
Harold H. Wright
BY
C. M. McKnight
ATTORNEY

United States Patent Office 3,064,410
Patented Nov. 20, 1962

3,064,410
APPARATUS FOR SEPARATING WELL FLUID
Harold H. Wright, 4222 E. 40th Place, Tulsa, Okla.
Filed Mar. 25, 1960, Ser. No. 17,607
6 Claims. (Cl. 55—168)

This invention relates to improvements in the separation of a well fluid stream into the component parts thereof, and more particularly, but not by way of limitation, to apparatus for separating the well stream into gas, liquid hydrocarbon and water, and delivering the separated components against variant line pressures.

In the production of petroleum products from a well bore, the well fluid stream usually comprises a mixture of gas, liquid hydrocarbons and salt water or brine. It is normally essential that the gaseous components and water be separated from the liquid hydrocarbons at an early stage in the handling of the well stream. The usual procedure is to move the well fluid from a plurality of wells through a free water knock-out apparatus, or through an oil and gas separator, or through both, at positions relatively near the well bore, and at a pressure not exceeding that of the well stream leaving the bore. It is desirable to combine the function of the free water knock-out with that of the oil and gas separator in order that the separation of the well fluid may be accomplished in one apparatus. However, there are certain disadvantages in providing one apparatus for the combined separation operation in that the outlet lines of the various components of the well stream are usually at different working pressure, making delivery of the separated components into the respective delivery or working line difficult.

The present invention contemplates a novel apparatus for separating a well stream into water, liquid hydrocarbon and gaseous components in one vessel wherein the separated components of the well fluid may be discharged therefrom regardless of the variance in the working pressures of the respective outlet lines. The novel apparatus may be utilized on individual wells in order to permit a trunk line gathering system for each of the components in a more economical manner than heretofore available, and to provide a simple and efficient means for gauging the production of water, gas and oil or liquid hydrocarbons from the unit well. In addition, a fuel or gas supply is readily available at each well when the novel apparatus is utilized therewith. Furthermore, discharging the separated components of the well fluid against pressure in the outlet line provides for disposal of the separated water under pressure into a water disposal well, or the like. In the case of fluid production from a well where a water flood is in progress, the novel apparatus will separate the water, gas and liquid hydrocarbons, and may be utilized for re-injecting the water under pressure. In a similar manner, the apparatus will separate the well fluid in a repressuring operation and may be utilized to reinject the separated gas under pressure. The apparatus will handle the stream from a plurality of wells or from a single well, as desired. The novel apparatus is simple and efficient in operation and economical and durable in construction.

It is an important object of this invention to provide a novel apparatus for the separation of a well fluid into the liquid and gaseous components thereof.

It is another object of this invention to provide a novel apparatus for the separation of a well fluid and to deliver the separated components into the respective outlet or service lines therefor regardless of the variance in pressures present therein.

Another object of this invention is to provide a novel apparatus for the separation of a well fluid wherein the water, liquid hydrocarbons and gaseous components thereof may be separated in a single stage operation.

Still another object of this invention is to provide a novel apparatus for the separation of a well fluid wherein condensable vapors and mist from the separated gaseous components may be recovered with the separated hydrocarbons.

A further object of this invention is to provide a novel apparatus for the separation of a well fluid wherein the well stream from a single well may be economically and efficiently separated at the well site.

An additional object of this invention is to provide apparatus for the separation of a well stream in conjunction with a salt water disposal operation wherein the separated water may be discharged into the disposal well or facility against a pressure greater than the working pressure of either the hydrocarbon or gas outlet lines.

It is a still further object of this invention to provide apparatus for the separation of a well stream in conjunction with a gas line system whereby the separated gas may be discharged into the gas line against a pressure greater than the working pressure of either the hydrocarbon outlet line or the water outlet line.

Still another object of this invention is to provide apparatus for the separation of a well stream wherein the separated liquid hydrocarbons may be discharged into the hydrocarbon outlet line against a pressure greater than the working pressure of either the gas or the water outlet lines.

And yet another object of this invention is to provide a novel apparatus for the separation of a well stream which is simple and efficient, as well as economical in operation.

Other objects and advantages of the invention will be evident from the following detailed description, read in conjunction with the accompanying drawings, which illustrate my invention.

Figure 1:
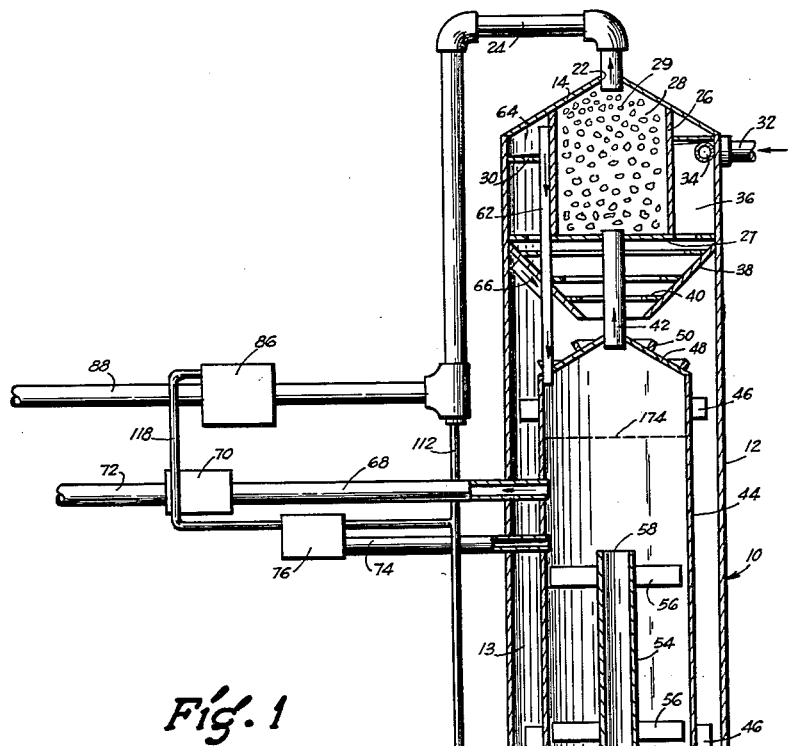
FIGURE 1 is a sectional elevational view of a separator apparatus embodying the invention.

Referring to the drawings in detail, and particularly FIG. 1, reference character 10 refers in general to a separator apparatus comprising an outer housing or shell 12 provided with an upper head portion or cover member 14 secured thereto in any well known manner (not shown) or integral therewith, as desired. A lower head portion or bottom cover 16 is provided at the opposite end of the shell 12 and is similarly secured thereto. A drain port 18 is centrally disposed in the bottom cover 16 for receiving a suitable drain conduit 20 for a purpose as will be hereinafter set forth. A centrally disposed outlet port 22 is provided in the upper head member 14 for receiving a gas outlet pipe 24 as will be hereinafter set forth in detail.

A cylindrical housing 26 having the lower end thereof closed by a plate 27 is secured to the upper head 14 in any suitable manner (not shown) and extends downwardly within the housing 12 to provide a mist chamber 28 therein. The mist chamber is preferably filled with any suitable permeable material 29 for extracting any liquid particles from the gaseous components. A spiral baffle plate 30 is suitably secured around the outer periphery of the sleeve 26 in the proximity of the upper portion of the housing 12, and preferably fits snugly against the inner periphery of the housing 12. A fluid inlet pipe 32 extends through the side wall of the housing 12 into communication with an internal inlet pipe or conduit 34 which discharges the incoming fluid or well stream into the housing 12 immediately below the spiral baffle plate 30 in a tangential direction around the inner periphery of the housing 12. This provides for a swirling of the incoming fluid or influent in the upper portion 36 of the housing 12. This swirling action of the fluid provides an initial separation of the gaseous components of the well stream from the liquid components thereof.

A funnel shaped or conical member 38 is secured to the lower portion of the housing 26 in any well known manner (not shown) and extends downwardly within the housing 12. The outer periphery of the enlarged portion of the funnel member 38 preferably fits snugly against the inner periphery of the housing 12 as clearly shown in FIG. 1. A plurality of spaced annular baffles 40 are provided on the inner periphery of the conical member 38 whereby the separated liquid components of the well stream will cascade downwardly thereover during the separation process as will be hereinafter set forth in detail. A centrally disposed pipe 42 extends through the plate 27 and downwardly through the funnel 38 to provide communication between the mist chamber 28 and an intermediate housing 44. The housing 44 is concentrically disposed within the housing 12 below the funnel 38 and may be secured therein by any suitable means, such as the brackets 46.

The intermediate housing 44 is provided with an upper head of cover member 48, preferably of a substantially conical configuration, which may be suitably secured thereto, or integral therewith. A plurality of upwardly extending angularly disposed circular baffles 50 are provided on the upper surface of the cover 48 for a purpose as will be hereinafter set forth. The lower end 52 of the housing 44 is open and terminates above the bottom cover 16 of the outer housing 12. An inner sleeve or housing 54 is concentrically disposed within the intermediate housing 44 and is secured therein by means of a plurality of brackets 56, or the like. The inner housing 54 is open at both ends with the upper end 58 thereof open to the interior of the housing 44 and the lower end 60 thereof extending below the lower end 52 of the housing 44 and open to the interior of the outer shell 12.

A substantially vertical tube or pipe 62 extends longitudinally within the outer housing 12 through the spiral baffle 30 and funnel 38 and into the interior of the intermediate housing 44 to provide communication between the interior of the housing 44 and an upper chamber 64 above the baffle 30. An angularly disposed pipe 66 is provided within the housing 12 below the funnel 38 and communicates with the pipe 62 for a purpose as will be hereinafter set forth.

A suitable conduit 68 extends through the sidewall of the outer shell 12 and into the interior of the intermediate housing 44 for discharging fluid from the housing 44 through a check valve 70 (FIG. 1) to an outlet line or delivery line 72. A second pipe or conduit 74 extends through the side wall of the housing 12 and into the housing 44 and is spaced slightly below the pipe 68 for supporting a pilot valve 76 and directing a portion of the fluid within the housing 44 thereto. A third conduit 78 extends through the side wall of the shell 12 below the intermediate housing 44 and into the interior of the inner housing 54 for discharging fluid therefrom to a second pilot valve 80 which is similar in structure to the valve 76. The drain conduit 20 discharges fluid from the lower portion 81 of the housing 12 to a pressure closing motor valve 82 which provides intermittent communication between the conduit 20 and an outlet or discharge line 84 for a purpose as will be hereinafter set forth. The gas outlet line 24 directs or delivers gas to a suitable pressure opening motor valve 86 which provides communication between the line 24 and an outlet or service line 88.

Figure 6:
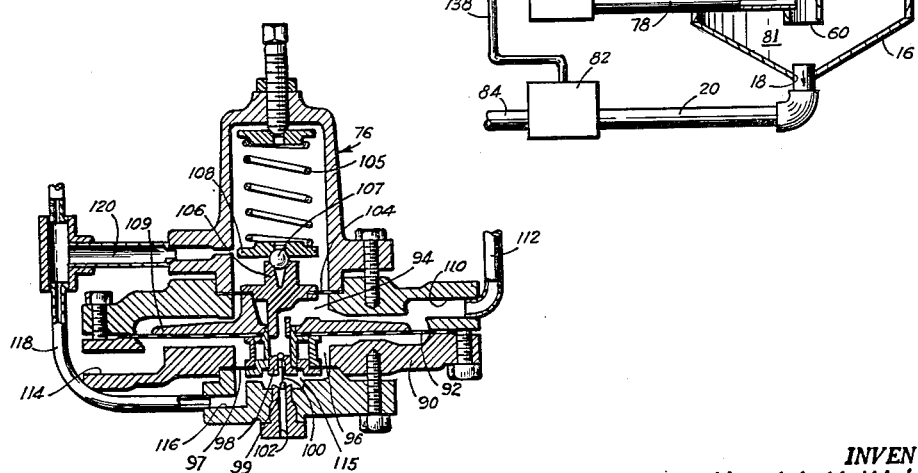
FIGURE 6 is a sectional elevation view of a pilot valve utilized in conjunction with the invention.

The pilot valves 76 and 80 are preferably identical and may be of the type shown in detail in FIG. 6, but not limited thereto. Any other type of control valve or operating mechanism for the motor valves 82 and 86 may be utilized as desired. Referring to FIG. 6, the valve 76 comprises a sectional body 90 having a main diaphragm 92 secured therein providing a chamber 94 thereabove and a chamber 96 therebelow. A lower diaphragm 97 cooperates with the diaphragm 92 for supporting a valve seat member 98 within the housing or body 90. The valve seat member 98 is provided with a port 99 therethrough which carries a toggle valve stem or double ball 100 therein. A vent port 102 is provided in the body 90 in substantial alignment with the port 99 whereby the double ball 100 functions in a double purpose for opening and closing both the valve 98 and the vent port 102 as will be hereinafter set forth. An upper diaphragm 104 is provided in the housing 90 and carries an insert member 106 having a ball 107 cooperating with a spring 105 and a plate member 108 for urging the insert 106 against a diaphragm plate 109 carried by the main diaphragm. The chamber 94 is open through a passageway 110 to a conduit 112 which in turn is in open communication with the gas outlet line 24. The chamber 96 is open through a passageway 114 to the outlet line 74. The chamber 115 below the lower diaphragm 97 is open through a passageway 116 to a conduit or line 118 which extends to the motor valve 86 to direct fluid to the chamber 160 therein. A branch conduit 120 provides communication between the line 118 and the upper side of the diaphragm 104, thus equalizing the downward force on the diaphragm 104 with the upward force on the diaphragm 97. The diaphragm 92 is therefore a balanced diaphragm with respect to gas pressure and the hydrostatic head or pressure in the chamber 96 tending to raise the diaphragm 92 and is off-set by the compression force of the spring 105 which urges the diaphragm 92 downwardly against the fluid pressure thereunder.

When the fluid delivered into the chamber 96 from the conduit 74 creates a hydrostatic head or pressure in the chamber 96 sufficiently great to overcome the downward forces acting on the diaphragm 92, the diaphragm 92 will flex upwardly for raising the double ball 100 and opening the vent port 102. The pressure fluid in line 118 will be exhausted to atmosphere through the open port 102, thereby relieving the pressure in the chamber 160 of the motor valve 86 to permit the valve 86 to close, as will be hereinafter set forth. Conversely, when the pressure within the chamber 96 is sufficiently reduced, and the compression of the spring 105 urges the diaphragm 92 to flex downwardly, the double ball 100 will seat on the vent port 102 for closing thereof and will simultaneously be raised from the port 99 for opening of the valve 98. Communication is thus established between the line 112 through the open valve 98 to the line 118 for repressuring the chamber 160 of the valve 86 whereby the valve 86 may open. The diaphragm 92 will remain in the lowered position whereby the valve 98 is open until the hydrostatic head within the chamber 96 is increased sufficiently to overcome the compression or downward force of the spring 105, at which time the diaphragm 92 will be flexed upwardly for opening the port 102 and venting the line 118, as hereinbefore set forth. It is to be understood that the valve 80 is of an identical structure as the valve 76 hereinbefore set forth in detail.

Figure 4:
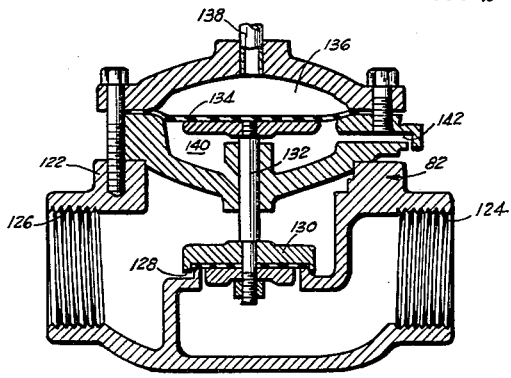
FIGURE 4 is a sectional elevational view of a motor valve utilized in conjunction with the invention.

The motor valve 82 is a pressure closing valve, and may be of any suitable type, such as the structure disclosed in FIG. 4. The valve 82 preferably comprises a body portion 122 having an inlet port 124 and an outlet port 126. A valve seat 128 is provided within the body 122 for receiving a valve insert member 130 thereagainst in the closed position of the valve 82. A valve stem 132 extends upwardly from the insert 130 and is carried by a diaphragm member 134, which is secured in the housing 122. The chamber 136 above the diaphragm 134 is open to a conduit 138, FIG. 1, which in turn is open to the bore or passageway 116 of the pilot valve 80 in a similar manner as the conduit 118 is in communication with the passageway 116 of the pilot valve 76. The chamber 140 below the diaphragm 134 is vented to the atmosphere through a passageway 142. When the pressure in the chamber 136 is greater than the upward forces acting on the under face of the valve insert 130, the diaphragm 134 is flexed downwardly whereby the valve stem 132 urges the valve insert 130 into a seating position on the valve seat 128. When the pressure in the chamber 136 is relieved or exhausted through the vent port 102 of the valve 80, the upward forces acting on the valve insert 130 will be greater than the downward force on the diaphragm 134 for raising the valve insert 130 from the seat 128 to open the valve 82.

Figure 5:
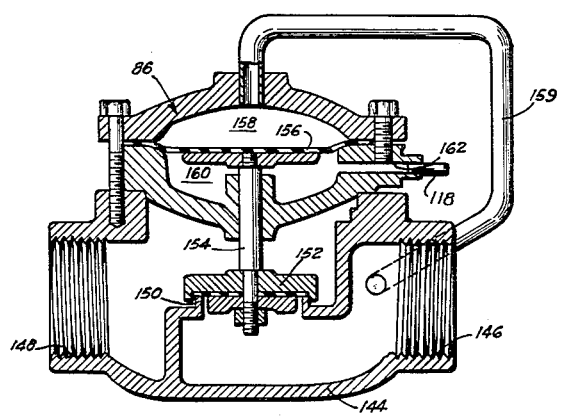
FIGURE 5 is a sectional elevation view of another motor valve utilized in conjunction with the invention.

The motor valve 86 is a pressure opening valve, and may be of any suitable type, such as shown in detail in FIG. 5. The valve 86 preferably comprises a body or housing 144 having an inlet port 146 and an outlet port 148. A valve seat 150 is provided in the body 144 for receiving a valve insert member 152 thereagainst in the closed position of the valve. A valve stem 154 extends upwardly from the valve insert 152 and is carried by a diaphragm member 156 which is secured within the body 144. The chamber 158 above the diaphragm 156 is in communication with the inlet port 146 by a pipe or tube 159. The chamber 160 below the diaphragm 156 is in communication with the line 118 of the pilot valve 76 through a passageway 162. When the pressure in chamber 160 equals or nearly equals the pressure in chamber 158, the pressure below the valve insert 152 will raise the insert 152 with respect to the valve seat 150, whereby fluid flow is established between the inlet port 146 and the outlet port 148.

Figure 2:
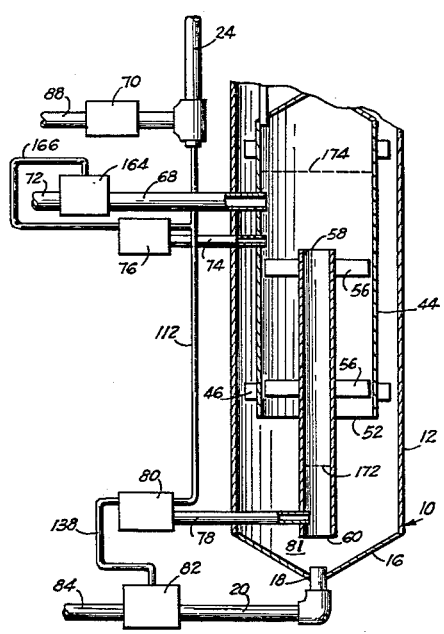
FIGURE 2 is a broken sectional elevational view depicting a modified arrangement of a separator embodying the invention.
Figure 3:
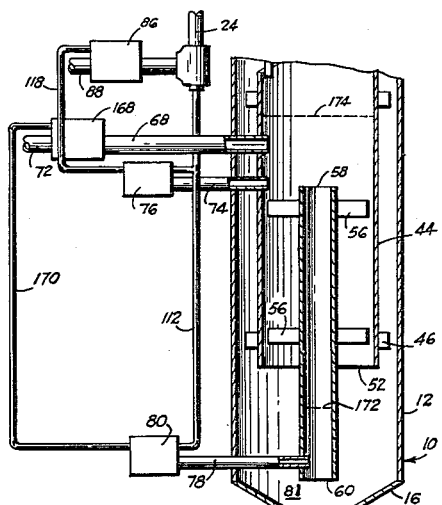
FIGURE 3 is a view similar to FIG. 2 illustrating another modified arrangement of a separator embodying the invention.

The motor valve 86, check valve 70, pilot valves 76 and 80, and the motor valve 82 are depicted only schematically in FIGS. 1, 2 and 3, and the general overall relationship between the valves in each of the embodiments disclosed in FIGS. 1, 2 and 3 is arranged to meet specific problems regarding the working pressures present in the delivery lines 88, 72 and 84. The delivery line 88 is normally considered to be the gas outlet or delivery line, whereas the delivery line 72 is the liquid hydrocarbon, or oil, line, and the outlet line 84 is the water delivery conduit. As hereinbefore set forth, it is to be noted from FIG. 1 that the pressure opening motor valve 86 is interposed in the gas outlet line and the pressure closing motor valve 82 is interposed in the water outlet line. The check valve 70, which may be of any suitable type, the details of which are not disclosed herein, is interposed in the liquid hydrocarbon outlet line for the purposes as will be hereinafter set forth in detail.

Referring now to FIG. 2, the apparatus 10 is generally similar or identical with the embodiment as shown in FIG. 1. The difference between the two embodiments resides in the arrangement of the various valve members. Under certain conditions to be hereinafter set forth, it is preferable that the check valve 70 be interposed in the gas outlet line 88. In addition, a pressure closing motor valve 164 preferably identical with the motor valve 82 is interposed in the liquid hydrocarbon outlet line 72 and is in communication with the port 116 of the pilot valve 76 through a conduit 166. The pilot valve 76 is open to the conduit 74 through passageway 114 as set forth in the arrangement of FIG. 1. The remaining portions of the embodiment in FIG. 2 are substantially identical with that disclosed in FIG. 1, as hereinbefore set forth in detail.

Referring now to FIG. 3, still another arrangement of the valve elements is disclosed which is preferable for certain working conditions to be hereinafter set forth. In this embodiment, the pilot valves 76 and 80 are in communication with the conduits 74 and 78, respectively, and the motor valve 86 is interposed in the gas outlet line 88, as depicted in FIG. 1. However, a motor valve 168, which is substantially identical with the valve 86, is interposed in the liquid hydrocarbon outlet line 72, and the chamber 160 of the valve 168 is in communication with the passageway 116 of the pilot valve 80 through a conduit 170 for a purpose as will be hereinafter set forth.

It is to be understood that the valves 82 and 164 are identical valves and although only valve 82 is set forth in detail herein, the structure of the valve 164 is the same and will be called for accordingly in the operation hereinafter set forth. Similarly, the valves 86 and 168 are of an identical structure and only the structure of the valve 86 is set forth in detail herein, since the same structure for both valves 86 and 168 will be utilized hereinafter.

OPERATION OF SEPARATING APPARATUS

It is desirable to separate the well fluid from a producing oil or gas well into the gaseous components, liquid hydrocarbons, and water at an early stage in the handling of the fluid or stream. The apparatus 10 may be installed at the well site (not shown) whereby the well stream from a single well, or a plurality of wells, is directed into the outer shell 12 through the inlet pipe 32. The influent coming through the pipe 32 is discharged into the swirl chamber 36 in a direction tangent to the inner periphery thereof by the discharge pipe 34. The swirling action of the fluid or centrifugal force thereof in combination with gravity causes an initial separation of the gaseous components from the liquid components. The gas thus separated tends to rise above the baffle 30 and collect in the chamber 64 thereabove. The baffle 30 substantially eliminates any collection of liquid within the chamber 64, and the gas trapped therein will flow downwardly through the pipe 62 into the upper portion of the intermediate housing 44.

The liquid portion of the fluid or well stream will fall downwardly through the funnel 38 in a cascade over the baffles 40, where a further separation of the gas from the liquid components occurs. The liquid components fall downwardly by gravity and impinge against the cover member 48 of the intermediate housing 44 and flow over the baffles 50 whereby the liquid is agitated for a further separation of the gas from the liquid components. The gas separated below the funnel 38 will tend to accumulate in the upper portion of the shell 12 below the funnel, and will be directed into the intermediate chamber 44 through the pipe 66 cooperating with the pipe 62.

The liquid components will fall downwardly and accumulate in the annular space 13 between the shell 12 and the housing 44 where an initial separation of the water from the liquid hydrocarbon components will occur. As the liquid accumulates in the annulus 13, the water particles or components of the influent, being heavier than the liquid hydrocarbons, tend to accumulate in the lower portion 81 of the shell 12 and flow into the inner housing 54 through the open lower end 60 thereof. In a similar manner, the liquid hydrocarbons will flow from the annulus 13 into the intermediate housing 44 through the open lower end 52 thereof, and into the upper portion of the inner housing or chamber 54 through the open upper end 58 thereof, thus establishing an oil-water or a liquid hydrocarbon-water interface 172 in the inner housing 54. Since the gaseous components are directed into the upper portion of the intermediate housing 44, an interface 174 will be established therein between the liquid hydrocarbons and the gaseous components.

The gaseous components present in the upper portion of the intermediate housing 44 will rise within the tube 42 and move through the mist extraction chamber 28 where any liquid components remaining with the gas will be precipitated therefrom and will fall downwardly by gravity through the pipe 42 and into the intermediate housing 44. The gas will be released from the mist extraction chamber 28, as is well known, for being discharged through the pipe 24 to the gas delivery or outlet line 88 in a manner as will be hereinafter set forth.

The separated liquid hydrocarbons present within the housing 44 will be discharged therefrom through the pipe 68 to the liquid hydrocarbon outlet line or delivery line 72, as will be hereinafter set forth. Similarly, the separated water or free water present within the inner housing 54 and in the lower portion 81 of the outer housing 12 will be discharged therefrom through the drain pipe 20 to the water delivery line 84, as will be hereinafter set forth.

VALVE ARRANGEMENT FOR VARIABLE DELIVERY LINE WORKING PRESSURES

There are many varied working pressure conditions under which the separated components of the well stream must be delivered into the respective service or outlet lines. The most probable working pressure conditions encountered in the delivery lines will normally be as follows:

*Outlet Line Relative Working Pressures*

| Probability | High | Intermediate | Low |
|---|---|---|---|
| 1 | Oil (line 72) | Gas (line 88) | Water (line 84). |
| 2 | Oil (line 72) | Water (line 84) | Gas (line 88). |
| 3 | Gas (line 88) | Water (line 84) | Oil (line 72). |
| 4 | Gas (line 88) | Oil (line 72) | Water (line 84). |
| 5 | Water (line 84) | Oil (line 72) | Gas (line 88). |
| 6 | Water (line 84) | Gas (line 88) | Oil (line 72). |

The embodiment disclosed in FIG. 1 is particularly adapted and arranged for the working conditions existing under probabilities 1 and 2 set forth in the table above. Considering probability 1, wherein the working pressure in the oil or liquid hydrocarbon delivery line 72 is the highest pressure, and the working pressure in the water outlet line 84 is the lowest, with the working pressure in the gas delivery line 88 being intermediate therebetween, the check valve 70 is normally in a closed position due to the high pressure in the line 72 with respect to the pressure in the line 68. As hereinbefore set forth, the valve 86 is a pressure opening valve and in the closed position precludes the escape of gas which displaces liquid from the apparatus. When the gas-oil interface 174 is sufficiently low in the apparatus, the pilot valve 76 will function so as to permit the valve 86 to open whereby gas will be delivered into line 88 and liquid will accumulate within the apparatus.

When the quantity of liquid hydrocarbon components within the apparatus 10 increase whereby the interface 174 raises appreciably within the housing 44, the hydrostatic head or pressure increases within the housing 44 and this increased pressure is communicated to the conduit 74, and through passageway 114 of the pilot valve 76 to the chamber 96. When this increased pressure is sufficiently great to flex the diaphragm 92 upwardly, the vent port 102 will be opened for venting the pressure in line 118 through passageway 116 and to the atmosphere. This relieves the pressure in the chamber 160 of the valve 86 whereby the valve insert 152 moves to a closed position against the valve seat 150. This ceases or interrupts the flow of the gas from the line 24 to the line 88, and causes the gas pressure to build up within the housing 44. This increased gas pressure acting on the interface 174 in combination with the increased hydrostatic head pressure is communicated through the conduit 68 to the check valve 70. When the pressure within the conduit 68 becomes greater than the working pressure within the line 72, the check valve 70 will open for delivery of the liquid hydrocarbons into the service line 72.

The discharge of the oil or liquid hydrocarbons through the check valve 70 lowers the interface 174, whereby the pressure in the chamber 96 decreases, and the diaphragm 92 flexes downwardly for closing the vent port 102. In this instance, the pressure in the chamber 94, which is in communication with the increased gas pressure through the line 112, will be sufficiently greater than the pressure in chamber 96 for flexing the diaphragm 92 downwardly and opening the valve 98. The gas pressure will flow from chamber 94 through the open valve 98 and for repressuring the chamber 160 in valve 86. The increase of pressure in the chamber 160 causes the diaphragm 156 to flex upwardly for raising the valve insert 152 from the valve seat 150, thus opening the valve 86 whereby the gas flow will be re-established to the delivery line 88. As the gas pressure is relieved in the housing 44 by the delivery of the gas through the valve 86, the pressure in the line 68 will be lessened whereby the check valve 70 will close and interrupt the delivery of the liquid hydrocarbons.

The level of the oil-water or liquid hydrocarbon-water interface 172 is maintained between the desired limits within the inner housing 54 and the lower portion 81 of the shell 12 by the cooperating pilot valve 80 and motor valve 82. The valve 82 is a pressure closing valve and in this embodiment is normally closed whereby there is no discharge of the water components to the service line 84. When the interface 172 rises sufficiently within the apparatus 10, the hydrostatic head or pressure is increased in the conduit 78. This increased pressure is communicated to the chamber 96 of the pilot valve 80 through the passageway 114. The increase in pressure in chamber 96 flexes the diaphragm 92 upwardly for opening the vent port 102 and simultaneously closing the valve 98 to preclude communication between chamber 94 and passageway 116 whereby the pressure in the line 138 is vented to atmosphere. This relieves the pressure in the chamber 136 of the valve 82 whereby the valve insert 130 is raised from the closed position against the valve seat 128. This permits the valve 82 to open whereby the water in the line 20 is delivered to the service line 84. The draining of the water from the lower portion 81 of the housing 12 causes the interface 172 to lower within the housing 54 for decreasing the hydrostatic pressure in the conduit 78 and chamber 96 of the pilot valve 80. The decreased pressure in the chamber 96 permits the diaphragm 92 to flex downwardly for closing the vent port 102 and opening valve 98, and the pressure in the chamber 94 is communicated through the open valve 98 to passageway 116 for repressuring line 138. The repressuring of the line 138 causes a pressure increase in the chamber 136 of the valve 82 for lowering the valve insert 130 into a closed position against the valve seat 128, thus stopping or interrupting the flow of water to the service line 84.

As hereinbefore set forth, the pilot valves 76 and 80 are of an identical type, but the adjustment of the pilot valve 76 is preferably such that the valve responds to smaller changes in the hydrostatic head than does the valve 80.

With a higher working pressure in the gas outlet line 88 than in the water outlet line 84, as in probability 1, there may be a tendency for the gas to backflow if the motor valves 82 and 86 were open simultaneously. The motor valve 86 is not conducive to backflow and actually functions as a check valve. A suitable check valve (not shown) may be interposed on the downstream side of the valve 86 in the gas outlet line 88, if desired.

Again referring to FIG. 1, in the operation of the apparatus 10 under the working conditions set forth in probability 2, wherein the working pressure in the water line 84 is greater than the working pressure in the gas line 88, the gas-oil interface 174 is maintained within the apparatus in the same manner as in probability 1. However, since the working pressure in the water outlet line 84 is greater than the working pressure in the gas outlet line 88, the water will not necessarily discharge through the line 20 when the motor valve 82 is opened. A continued accumulation of liquid in the separator 10 maintains the motor valve 82 in an open position, and the gas-oil interface 174 will rise within the apparatus. The rise of the interface 174 will cause the motor valve 86 to close whereby the pressure will increase within the separator 10, thus causing the water to discharge through the open motor valve 82 and delivery thereof is through the outlet line 84, until the lowering of the oil-water interface 172 causes the valve 82 to close, or the lowering of the gas-oil interface 174 causes the motor valve 86 to open. In the latter case, there will be no backflow of water as the motor valve 82 will not permit a flow in the reverse direction. The oil or liquid hydrocarbons are discharged in the manner as hereinbefore set forth.

Referring now to FIG. 2, the valve arrangement depicted therein is preferably for conditions or probabilities 3 and 4, wherein the working pressure in the gas outlet line 88 is the greatest. Under the working conditions of probability 3, the pressure in the water outlet line 84 is greater than that in the oil line 72, and the gas-oil or gas-liquid hydrocarbon interface 174 is maintained at the predetermined level by the cooperating action of the pilot valve 76 and the motor valve 164 in the manner as hereinbefore set forth in the cooperation of the pilot 80 and motor valve 82. As the gas-oil interface 174 rises upon the accumulation of liquid in the separator 10, the increased hydrostatic head causes the pilot valve 76 to vent the line 166, thus permitting the valve 164 to open for discharging oil or liquid hydrocarbons to the outlet line 72. The lowering of the interface 174 upon the discharging of the liquid hydrocarbons causes the pilot valve 76 to pressurize the line 166 and close the valve 164 for interrupting the discharge of oil.

The oil-water interface 172 is maintained at the predetermined level in the same manner as set forth for probabilities 1 and 2 as shown in FIG. 1.

The accumulation of gas within the separator 10 causes the pressure therein to increase until a favorable differential is established across the check valve 70 in the line 88, whereby the check valve will open and provide for a discharge of the gas into the outlet line 88. Since the working pressure in the oil outlet line 72 is lower than the working pressure in the water outlet line 84, no water will discharge while the valve 164 is open. Although the valve 82 in the water outlet line 84 will not normally permit backflow of water to occur, it may be desirable to provide a check valve (not shown) downstream from the motor valve 82.

When the working conditions of the system are in accordance with probability 4, wherein the working pressure in the oil line 72 is greater than that in the water line 84, the embodiment depicted in FIG. 2 is again preferred, and the operation of the separator 10 is very similar to that under probability 3, hereinbefore set forth. However, with probability 4, the working pressure in the oil or liquid hydrocarbon outlet line 72 is greater than the working pressure in the water outlet line 84. Under this condition, water will discharge whenever the valve 82 is open, and the liquid hydrocarbons will not discharge simultaneously therewith. It may be desirable to interpose a check valve (not shown) on the downstream side of the valve 164 for further assuring no backflow of the liquid hydrocarbons during the operation of the apparatus 10.

Under the working conditions of probabilities 5 and 6, wherein the working pressure in the water outlet line 84 is the greatest, the valve arrangement depicted in FIG. 3 is preferable. The gas-oil interface 174 is maintained at the predetermined level in the separator 10 by the action of the pilot valves 76 and 80 controlling the motor valves 86 and 168, respectively. The pilot valves alternately pressurize and vent the lines 118 and 170 to provide the valve action. Accumulation of liquid within the separator 10 causes the interface 174 to rise whereby the hydrostatic head increases the pressure on the valve 76. The valve 76 then vents the line 118 for closing the valve 86. Thereafter, either of two sequences or cycles follows, depending upon the position of the oil-water interface 172.

If the oil-water interface 172 rises sufficiently while the gas-oil interface 174 rises, the increased hydrostatic head pressure acting on the pilot valve 80 causes the valve to vent the line 170 for closing the valve 168 and stopping the flow of oil from the housing 44. Gas, oil and water continue to accumulate within the apparatus 10 until the pressure therein is sufficiently great for opening the check valve 70 against the working pressure in the line 84, whereby the water will be discharged therethrough. Lowering of the oil-water interface 172 decreases the pressure in the line 78 acting on the pilot valve 80 whereby the line 170 is repressured for opening the valve 168 and continuing the delivery of oil or liquid hydrocarbons through the line 72.

If the oil-water interface 172 is not sufficiently high to actuate the pilot valve 80 for closing the valve 168, the oil will continue to discharge until the lowering of the oil-gas interface 174 permits the motor valve 86 to open for discharging gas therethrough. Continuing accumulation of liquid within the separator causes the interface 174 to rise, and the discharge of gas to be interrupted, thus completing the discharge cycle. It is to be noted that it is possible for either of the above sequences to repeat itself one or more times before the other ensues.

The operation of the embodiment depicted in FIG. 3 under the conditions of probability 6, wherein the working pressure in the gas line 88 is greater than that in the oil line 72, is similar to that of conditions under probability 5. However, water must accumulate at a rate great enough to close the valve 168 at least as soon as the valve 86. In the event that the ratio of water to oil in the well stream or influent entering the separator 10 is small, any of several minor changes may be made. For example, a motor valve (not shown), such as the valve 82, may be interposed in the oil outlet line 72 in addition to the valve 168. The valve 76 could operate the valve through a branch line (not shown) from the line 118, in addition to operating the valve 86. With the apparatus 10 so equipped, the valve, such as valve 82, would be closed when the valve 86 were opened, and vice versa, thereby precluding a loss of an excessive quantity of the liquid components from the separator, and the ensuing flow of gas through the line 72.

As hereinbefore set forth, the probabilities 1 through 6 represent the most frequent conditions which might be encountered. However, there are other working conditions, such as when the working pressure of two of the outlet lines is equal and either greater or less than the working pressure in the remaining line, which may be met by similar valve arrangements.

By way of summary, the influent enters the separator 10 through the inlet pipe 32 and is discharged into the swirl chamber 36 wherein an initial separation of the gas from the liquid occurs. The gaseous components tend to collect in the chamber 64 and flow downwardly through the pipe 62 into the upper portion of the housing 44. The liquid components fall downwardly by gravity and accumulate in the annular space 13. A final separation of the gas from the liquid occurs in the shell 12, and the water or brine in the liquid portion tends to settle to the lower portion 81 thereof. The gaseous components rise through the mist extraction chamber 28 wherein any remaining liquid particles are separated therefrom, and the gas is discharged through the outlet pipe 24. The liquid hydrocarbons collect or accumulate within the intermediate housing 44 and are discharged therefrom through the pipe 68, and the water components accumulate in the lower portion 81 of the shell 12 and within the inner housing 54 and are discharged therefrom through the drain pipe 20. The valve arrangements for discharging the separated components of the well fluid or influent may be so arranged as to discharge the components from the separator under variant working pressures in the outlet or service delivery lines.

From the foregoing, it will be apparent that the present invention provides a novel apparatus for separating a well fluid or stream into the gaseous, liquid hydrocarbon and water components thereof in such a manner that the separated components may be discharged from the apparatus against variable working pressure conditions present in the respective delivery lines. The novel method and apparatus is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An apparatus for separating a fluid stream into gas and first and second liquid components of different specific gravities, one of said components being discharged from said apparatus at relatively higher pressure than the discharge pressures of the other of said components, said apparatus comprising: an outer housing; inlet means in said outer housing disposed to admit said fluid stream to said outer housing; an intermediate housing within said outer housing and communicating primarily with said outer housing adjacent the bottom of said intermediate housing; an inner housing disposed substantially within said intermediate housing, and having openings at the upper and lower ends of said inner housing; gas outlet means communicating with the top of said intermediate housing; first liquid outlet means, said first liquid outlet means communicating with said intermediate housing; second liquid outlet means, said second liquid outlet means communicating with said outer housing below the level of said first liquid outlet means; first valve means, said first valve means being responsive to the hydrostatic head adjacent the interface between said liquid components in said inner housing; second valve means, said second valve means being responsive to the hydrostatic head adjacent the gas-liquid interface in said intermediate housing and of greater sensitivity than said first valve means, said first and second valve means being connected to said outlet means of said components discharging under lower pressure whereby the interface between said liquid components is maintained at a level intersecting said inner housing, and said gas-liquid interface is maintained at a level above the upper opening of said inner housing; and check valve means in the outlet means of said higher pressure component.

2. An apparatus for separating a fluid stream into gas and first and second liquid components of different specific gravities, one of said components being discharged from said apparatus at relatively higher pressure than the discharge pressures of the other of said components, said apparatus comprising: an outer housing; inlet means in said outer housing adjacent the upper extremity thereof disposed to admit said fluid stream tangentially with respect to said outer housing; an intermediate housing within said outer housing and communicating primarily with said outer housing adjacent the bottom of said intermediate housing; an inner housing disposed substantially within said intermediate housing, and having openings at the upper and lower ends of said inner housing; gas outlet means communicating with the top of said intermediate housing; first liquid outlet means, said first liquid outlet means communicating with said intermediate housing; second liquid outlet means, said second liquid outlet means communicating with said outer housing below the level of said first liquid outlet means; first valve means, said first valve means being responsive to the hydrostatic head adjacent the interface between said liquid components in said inner housing; second valve means, said second valve means being responsive to the hydrostatic head adjacent the gas-liquid interface in said intermediate housing, said first and second valve means being connected to said outlet means of said components discharging under lower pressure whereby the interface between said liquid components is maintained at a level intersecting said inner housing, and said gas-liquid interface is maintained at a level above the upper opening of said inner housing; and check valve means in the outlet means of said higher pressure component.

3. An apparatus for separating a fluid stream into gas and first and second liquid components of different specific gravities, one of said components being discharged from said apparatus at relatively higher pressure than the discharge pressures of the other of said components, said apparatus comprising: an outer housing; inlet means in said outer housing disposed to admit said fluid stream to said outer housing; an intermediate housing within said outer housing and communicating primarily with said outer housing adjacent the bottom of said intermediate housing; an inner housing disposed substantially within said intermediate housing, and having openings at the upper and lower ends of said inner housing; gas outlet means communicating with the top of said intermediate housing; first liquid outlet means, said first liquid outlet means communicating with said intermediate housing at a level above the upper opening of said inner housing; second liquid outlet means, said second liquid outlet means communicating with said outer housing below the level of the lower openings of said inner housing; first valve means, said first valve means being responsive to the hydrostatic head adjacent the interface between said liquid components in said inner housing; second valve means, said second valve means being responsive to the hydrostatic head adjacent the gas-liquid interface in said intermediate housing, said first and second valve means being connected to said outlet means of said components discharging under lower pressure whereby the interface between said liquid components is maintained at a level intersecting said inner housing, and said gas-liquid interface is maintained at a level above the upper opening of said inner housing; and check valve means in the outlet means of said higher pressure component.

4. An apparatus for separating a fluid stream into gas and first and second liquid components of different specific gravities, one of said components being discharged from said apparatus at relatively higher pressure than the discharge pressures of the other of said components, said apparatus comprising: an outer housing; inlet means in said outer housing disposed to admit said fluid stream to said outer housing; an intermediate housing within said outer housing and communicating primarily with said outer housing adjacent the bottom of said intermediate housing; an inner housing disposed substantially within said intermediate housing, and having openings at the upper and lower ends of said inner housing; gas outlet means communicating with the top of said intermediate housing; first liquid outlet means, said first liquid outlet means communicating with said intermediate housing; second liquid outlet means, said second liquid outlet means communicating with said outer housing below the level of said first liquid outlet means, first valve means, said first valve means being responsive to the hydrostatic head adjacent the interface between said liquid components in said inner housing; second valve means, said second valve means being responsive to the hydrostatic head adjacent the gas-liquid interface in said intermediate housing, said first and second valve means being connected to said outlet means of said components discharging under lower pressure whereby the interface between said liquid components is maintained at a level intersecting said inner housing, and said gas-liquid interface is maintained at a level above the upper opening of said inner housing; and check valve means in the outlet means of said higher pressure component.

5. An apparatus for separating a fluid stream into gas and first and second liquid components of different specific gravities, one of said components being discharged from said apparatus at relatively higher pressure than the discharge pressures of the other of said components, said apparatus comprising: an outer housing; inlet means in said outer housing disposed to admit said fluid stream to said outer housing; an intermediate housing within said outer housing and communicating primarily with said outer housing adjacent the bottom of said intermediate housing; an inner housing disposed substantially within said intermediate housing, and having openings at the upper and lower ends of said inner housing; gas outlet means communicating with the top of said intermediate housing; first liquid outlet means, said first liquid outlet means communicating with said intermediate housing; second liquid outlet means, said second liquid outlet means communicating with said outer housing below the level of said first liquid outlet means; first valve means, said first valve means being responsive to the position of the interface between said liquid components in said inner housing; second valve means, said second valve means being responsive to the position of the gas-liquid interface in said intermediate housing and of greater sensitivity than said first valve means, said first and second valve means being connected to said outlet means of said components discharging under lower pressure whereby the interface between said liquid components is maintained at a level intersecting said inner housing, and said gas-liquid interface is maintained at a level above the upper opening of said inner housing; and check valve means in the outlet means of said higher pressure component.

6. An apparatus for separating a fluid stream into gas and first and second liquid components of different specific gravities, one of said components being discharged from said apparatus at relatively higher pressure than the discharge pressures of the other of said components, said apparatus comprising: an outer housing; inlet means in said outer housing disposed to admit said fluid stream to said outer housing; an intermediate housing within said outer housing and communicating primarily with said outer housing adjacent the bottom of said intermediate housing; an inner housing disposed substantially within said intermediate housing, and having openings at the upper and lower ends of said inner housing; gas outlet means communicating with the top of said intermediate housing; first liquid outlet means, said first liquid outlet means communicating with said intermediate housing; second liquid outlet means, said second liquid outlet means communicating with said outer housing below the level of said first liquid outlet means; first valve means, said first valve means being responsive to the position of the interface between said liquid components in said inner housing; second valve means, said second valve means being responsive to the position of the gas-liquid interface in said intermediate housing, said first and second valve means being connected to said outlet means of said components discharging under lower pressure whereby the interface between said liquid components is maintained at a level intersecting said inner housing, and said gas-liquid interface is maintained at a level above the upper opening of said inner housing; and check valve means in the outlet means of said higher pressure component.

References Cited in the file of this patent

UNITED STATES PATENTS

| | | |
|---|---|---|
| 2,167,160 | Raymond | July 25, 1939 |
| 2,598,988 | Glasgow | June 3, 1952 |
| 2,726,729 | Williams | Dec. 13, 1955 |
| 2,833,369 | Laurence et al. | May 6, 1958 |
| 2,948,352 | Walker et al. | Aug. 9, 1960 |